(12) United States Patent
Ichikawa et al.

(10) Patent No.: US 10,014,509 B2
(45) Date of Patent: Jul. 3, 2018

(54) BATTERY WIRING MODULE

(71) Applicant: YAZAKI CORPORATION, Tokyo (JP)

(72) Inventors: Yoshiaki Ichikawa, Shizuoka (JP); Hirotaka Mukasa, Shizuoka (JP); Hirokuni Koike, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 25 days.

(21) Appl. No.: 15/161,624

(22) Filed: May 23, 2016

(65) Prior Publication Data

US 2016/0268577 A1 Sep. 15, 2016

Related U.S. Application Data

(63) Continuation of application No. PCT/JP2014/084359, filed on Dec. 25, 2014.

(30) Foreign Application Priority Data

Dec. 25, 2013 (JP) ................................. 2013-267768

(51) Int. Cl.
*H01M 2/24* (2006.01)
*H01M 2/20* (2006.01)
(Continued)

(52) U.S. Cl.
CPC ......... *H01M 2/206* (2013.01); *H01M 2/1077* (2013.01); *H01M 10/482* (2013.01); *H01R 25/162* (2013.01); *H01M 2220/20* (2013.01)

(58) Field of Classification Search
CPC ...... H01M 2/206; H01M 2/204; H01M 2/105; H01R 31/06; C08J 7/065; B05D 7/02; Y02E 60/12
(Continued)

(56) References Cited

U.S. PATENT DOCUMENTS 8,388,382 B2 * 3/2013 Ikeda ................... H01M 2/1077
439/397
8,545,271 B2 * 10/2013 Henmi ................ H01M 2/1083
439/208
(Continued)

FOREIGN PATENT DOCUMENTS

JP 2006-164752 A 6/2006
JP 2010-114025 A 5/2010
(Continued)

OTHER PUBLICATIONS

International Search Report of PCT/JP2014/084359 dated Feb. 17, 2015.
(Continued)

*Primary Examiner* — Hien Vu
(74) *Attorney, Agent, or Firm* — Sughrue Mion, PLLC

(57) ABSTRACT

Provided is a battery wiring module including: a plurality of linear conductors disposed in parallel with a predetermined gap therebetween; a plurality of busbars disposed in parallel along at least one of the linear conductors disposed at both ends having a predetermined gap therebetween so as to electrically connect electrode terminals provided in at least two battery cells connected to each other in the same direction among the plurality of battery cells overlapping each other in the same direction, the electrode terminals being arranged in the same direction; a first insulating resin portion which integrally coats the outer peripheral portions of the plurality of linear conductors and a side edge portion adjacent to the linear conductor in the plurality of busbars; and a connection conductor which electrically connects the linear conductor and the busbar to each other.

3 Claims, 13 Drawing Sheets

(51) Int. Cl.
*H01M 2/10* (2006.01)
*H01R 25/16* (2006.01)
*H01M 10/48* (2006.01)

(58) Field of Classification Search
USPC ............... 429/158, 99, 160; 439/627, 623
See application file for complete search history.

(56) References Cited

U.S. PATENT DOCUMENTS

| | | | |
|---|---|---|---|
| 8,777,668 B2 * | 7/2014 | Ikeda | ............... H01M 2/206 |
| | | | 439/627 |
| 2012/0212232 A1 | 8/2012 | Ikeda et al. | |
| 2013/0234511 A1 | 9/2013 | Murata | |
| 2014/0017533 A1 | 1/2014 | Nishihara et al. | |
| 2014/0335386 A1 | 11/2014 | Ikeya et al. | |

FOREIGN PATENT DOCUMENTS

| | | |
|---|---|---|
| JP | 2011-049047 A | 3/2011 |
| JP | 2012-226969 A | 11/2012 |
| JP | 2014-220149 A | 11/2014 |
| WO | 2011/052699 A1 | 5/2011 |
| WO | 2012/131809 A1 | 10/2012 |
| WO | 2013/030891 A1 | 3/2013 |

OTHER PUBLICATIONS

Communication dated May 30, 2017 issued by the Japanese Patent Office in counterpart application No. 2015-555010.

* cited by examiner

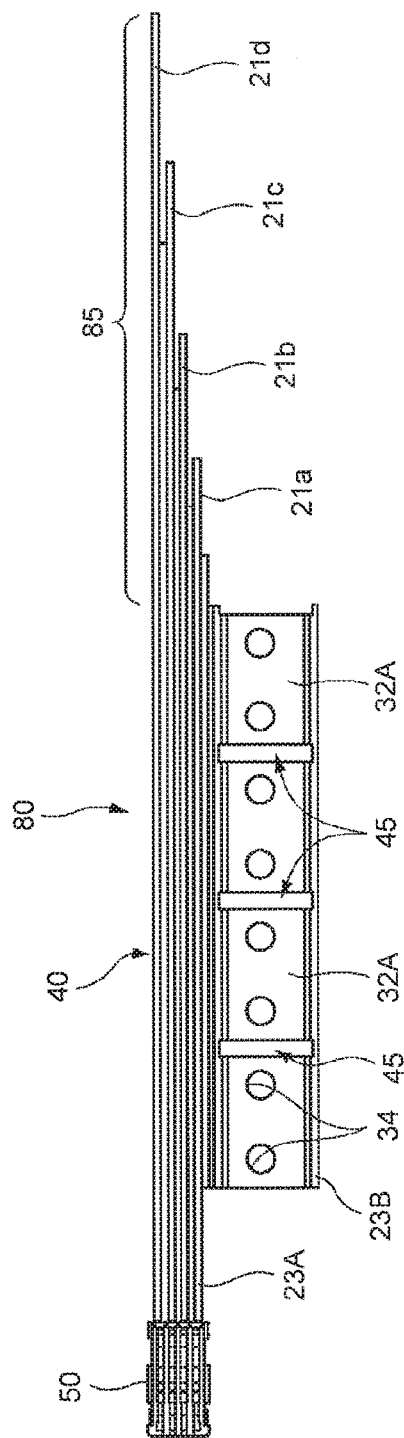

BATTERY WIRING MODULE

CROSS-REFERENCE TO RELATED APPLICATION

This application is a continuation application of International Application PCT/JP2014/084359, filed on Dec. 25, 2014, and designating the U.S., the entire contents of which are incorporated herein by reference.

BACKGROUND OF THE INVENTION

1. Field of the Invention

The present invention relates to a battery wiring module.

2. Description of the Related Art

An in-vehicle battery pack which is connected to a power converter for driving a motor is mounted on a vehicle such as a hybrid vehicle or an electric vehicle. The battery pack is equipped with a battery module including a plurality of battery cells. In the battery module, the battery cells overlap one another so that one-side electrode terminals of the battery cells are arranged in a line and the other-side electrode terminals thereof are arranged in a line. In the battery pack, the electrode terminals of the adjacent battery cells are connected to each other by a connection member such as a busbar so that the plurality of battery cells is connected in series or in parallel. Then, there is a case in which an electric wire is connected to each of the connection members. For this reason, when the battery module is assembled, there is a need to connect the electrode terminals at a plurality of positions by the connection members and to route the electric wires connected to the connection members on the battery module. Hitherto, a busbar module obtained by insert-molding a plurality of connection members in insulating resin has been used.

Incidentally, when the plurality of battery cells is connected in series or in parallel, there is a possibility that the durability of the battery cell may be degraded when a battery characteristic such as a voltage across the battery cells is not uniform. Here, in order to stop a charging or discharging operation before abnormality occurs in the voltage across the battery cells in the in-vehicle battery pack, the above-described electric wire (the voltage detection line) for detecting the voltage of the battery cell is provided in each connection member (each busbar). However, the plurality of voltage detection lines in the busbar module is routed on the battery module in a bound state. For this reason, when the number of the voltage detection lines is large in such a busbar module, the bound voltage detection lines are thickened. Thus, there is a possibility that the voltage detection line is not easily bent or is increased in weight so that the wiring is not easily made.

Further, the busbar module of the related art employs a structure in which the front end of the coated voltage detection line is peeled, a round terminal is crimped to an exposed core wire, the round terminal is fitted to an electrode terminal of the battery cell, and the round terminal is fixed to a male screw portion of the electrode terminal along with a connection member by a nut. For this reason, there is a possibility that the busbar module may cause a voltage drop due to an increase in resistance of a contact surface between the connection member and the round terminal.

Here, in the battery pack of the related art, there is proposed a high-voltage detection module device (a busbar module) capable of easily wiring the battery cells with a simple structure and suppressing a voltage drop (for example, see Japanese Patent Application Laid-open No. 2010-114025). In the high-voltage detection module device of the battery pack, a plurality of busbars is disposed in an insulation frame assembled to a battery pack body so that a predetermined cathode terminal and a predetermined anode terminal are connected to each other in the battery cell, a flat cable is disposed in an area of the insulation frame other than the busbar arrangement area, and a conductor line having a base notched in a predetermined shape is welded to a predetermined busbar in the conductor lines of the flat cable.

Since the high-voltage detection module device includes the insulation frame, the plurality of busbars, and the flat cable, the structure is simplified. Further, since the high-voltage detection module device is formed by a step of arranging busbars in the insulation frame, a step of separating the conductor lines of the flat cable, and a step of welding the conductor lines to the busbars, the wiring operation is simplified.

However, in the high-voltage detection module device of Japanese Patent Application Laid-open No. 2010-114025, the insulation frame has a configuration in which a plurality of protrusion portions is provided in a lower surface of a flat rectangular plate-shaped portion with a predetermined gap therebetween and a plurality of openings is provided in the plate-shaped portion with a predetermined gap therebetween. That is, in the high-voltage detection module device, the predetermined gap between the plurality of protrusion portions fitted to a gap between the battery cells and the number of the protrusion portions need to be changed in response to the size of the battery cell as well as the predetermined gap between the plurality of openings opened at a gap between the cathode terminal and the anode terminal of the battery cell and the number of openings, and the insulation frame is dedicated in accordance with the type of the battery pack. For that reason, the high-voltage detection module device has a problem in which the versatility is low and the manufacturing cost is not easily decreased.

SUMMARY OF THE INVENTION

The present invention is made in view of the above-described circumstance, and an object of the present invention is to provide a method for manufacturing battery wiring module capable of easily wiring the battery cells with a simple structure, increasing the versatility, and decreasing the manufacturing cost.

In order to achieve the above mentioned object, a battery wiring module according to one aspect of the present invention includes a plurality of linear conductors which is disposed in parallel with a predetermined gap therebetween; a plurality of busbars which is disposed in parallel along at least one of the linear conductors disposed at both ends while having a predetermined gap therebetween so as to electrically connect electrode terminals provided in at least two battery cells connected to each other in the same direction among the plurality of battery cells overlapping each other in the same direction, the electrode terminals being arranged in the same direction; an insulating resin portion configured integrally to coat outer peripheral portions of the plurality of linear conductors and side edge portions adjacent to the linear conductors in the plurality of busbars; and an electric connection portion configured electrically to connect the linear conductors and the busbars to one another, wherein the electric connection portion electrically connects an end of each of the linear conductors to the predetermined busbar, the linear conductor being formed by separating a gap between the plurality of linear conductors at one end of the insulating resin portion.

In order to achieve the above mentioned object, a battery wiring module according to another aspect of the present invention includes a plurality of linear conductors which is disposed in parallel with a predetermined gap therebetween; a plurality of busbars which is disposed in parallel along at least one of the linear conductors disposed at both ends while having a predetermined gap therebetween so as to electrically connect electrode terminals provided in at least two battery cells connected to each other in the same direction among the plurality of battery cells overlapping each other in the same direction, the electrode terminals being arranged in the same direction; an insulating resin portion configured integrally to coat outer peripheral portions of the plurality of linear conductors and side edge portions adjacent to the linear conductors in the plurality of busbars; and an electric connection portion configured electrically to connect the linear conductors and the busbars to one another, wherein the electric connection portion is a connection conductor of which one end is provided with a press-contact connection portion press-connected to the predetermined linear conductor coated by the insulating resin portion and the other end is electrically connected to the predetermined busbar.

According to still another aspect of the present invention, it is desirable that a cathode busbar to be electrically connected only to a cathode terminal and an anode busbar to be electrically connected only to an anode terminal are provided, and the cathode busbar and the anode busbar are provided with cut raised portions electrically connected to the predetermined linear conductor coated by the insulating resin portion.

According to still another aspect of the present invention, it is desirable that the side edge portion of the busbar is provided with a connection reinforcement portion which increases a connection force between the busbar and the insulating resin portion.

According to still another aspect of the present invention, it is desirable that when the insulating resin portion is set as a first insulating resin portion, a second insulating resin portion integrally connecting opposite side edge portions which face the side edge portions of the plurality of busbars is provided in the opposite side edge portions.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8A is a top view of a battery wiring module before a connecting step according to a second embodiment of the present invention;

DETAILED DESCRIPTION OF THE PREFERRED EMBODIMENTS

Figure 1:
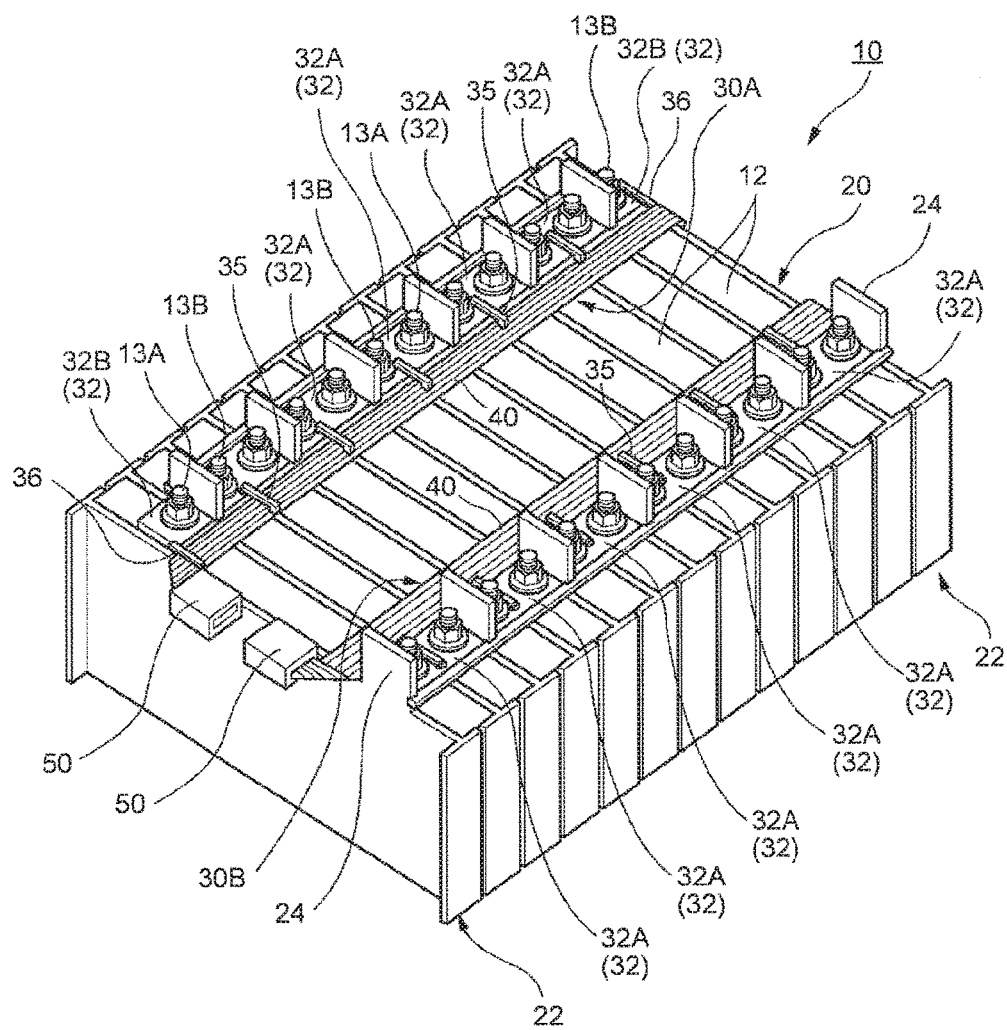
FIG. 1 is an entire perspective view of a battery pack obtained by combining a battery wiring module according to a first embodiment of the present invention.

Hereinafter, embodiments of a battery wiring module according to the present invention will be described in detail with reference to the drawings. In addition, the present invention is not limited to the embodiments.

First Embodiment

A battery wiring module is provided in a battery pack and is provided in a battery module including a plurality of battery cells. The battery pack is mounted on, for example, a vehicle such as an electric vehicle or a hybrid vehicle and is used to transmit or receive (charge or discharge) electric power to or from a rotator (an electric motor, a generator, and an electric generator) as a drive source of the vehicle through an inverter. In the battery module, the battery cells overlap one another in the same direction so that one-side electrode terminals of the battery cells are arranged in a line and the other-side electrode terminals thereof are arranged in a line. For example, as the battery module, the electrode terminals are arranged in a row so that a cathode terminal and an anode terminal are alternately arranged or the same electrode terminals are arranged. In the battery pack, one-side electrode terminals of a predetermined plurality of battery cells are connected to each other by a connection member (a first connection member) such as a busbar so that the plurality of battery cells is connected in series or in parallel. The first connection member is used to electrically connect the electrode terminals provided in at least two battery cells connected to each other in the same direction among the plurality of battery cells overlapping one another in the same direction. Here, the electrode terminals are arranged in the same direction. Further, in the battery pack, a connection member (a second connection member) such as a busbar is connected to the cathode terminal and the anode terminal disposed at both ends of the battery module. Further, a linear conductor (an electric wire) is connected to the first connection member or the second connection member. When the first and second connection members and the linear conductors can be used to check, for example, a battery state, these members can be used to transmit electric power during a charging/discharging operation. The battery wiring module of the embodiment is configured as a module of the connection members (the first and second connection members) and the linear conductor. Each battery wiring module is disposed in each row of the electrode terminals. As illustrated in FIGS. 1, 2, 3A, and 3B, a battery pack 10 of the embodiment includes a battery module 20 with a plurality of battery cells 12 and battery wiring modules 30A and 30B. The battery module 20 has a configuration in which the plurality of battery cells 12 is disposed inside a box-shaped casing (not illustrated) and is fixed therein through a separator. The battery wiring modules 30A and 30B of the embodiment are exemplified to measure the voltage (that is, the battery state) of the battery cell 12.

Each of the battery wiring modules 30A and 30B according to the embodiment includes a plurality of busbars 32 which connects the plurality of battery cells 12 in series to each other, a voltage detection line 40 which measures a voltage of each battery cell 12, and a connector 50 which is connected and fixed to one end of the voltage detection line 40. The busbar 32 is divided into a busbar (a first connection member) 32A and a busbar (a second connection member) 32B.

The battery cell 12 is a secondary battery, and includes a cathode terminal 13A and an anode terminal 13B as electrode terminals. As the battery cell 12, a cell having a rectangular parallelepiped casing or a so-called laminate cell is known. The battery cell 12 of this example has a configuration in which the cathode terminal 13A and the anode terminal 13B protrude in the same direction. For example, in the case of a cell having a rectangular parallelepiped casing, the cathode terminal 13A and the anode terminal 13B protrude from one surface of the casing. Specifically, as illustrated in FIG. 1, the battery cell 12 of the embodiment has a configuration in which the cathode terminal 13A and the anode terminal 13B protrude from the top surface (for example, a surface facing the upside of the vehicle when the battery cell is mounted on the vehicle). The battery cells 12 overlap each other so as to be connected in the same direction, and hence two rows of electrode terminals are formed so as to be arranged in the same direction. The battery cells 12 of this example overlap each other while alternately changing the direction so that the cathode terminal 13A and the anode terminal 13B are adjacent to each other in each row. That is, the cathode terminal 13A and the anode terminal 13B are alternately arranged in each row.

Figure 7A:
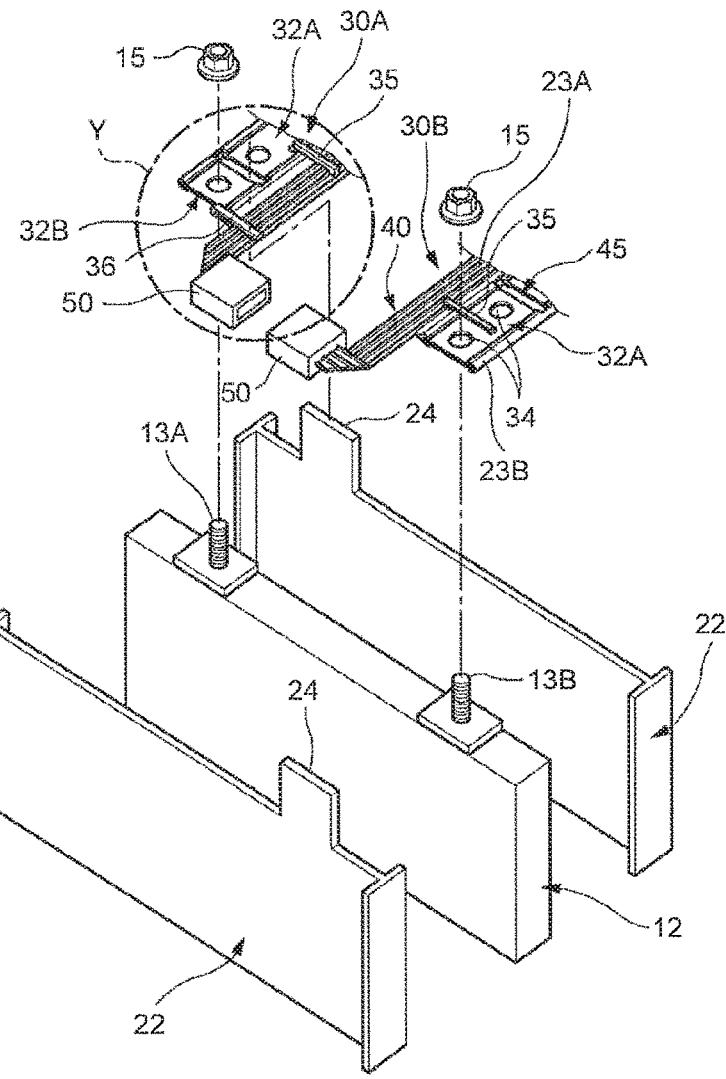
FIG. 7A is a main exploded perspective view of the battery pack illustrated in FIG. 1.

An insulating resinous separator 22 illustrated in FIG. 7A is disposed at both sides of each battery cell 12 (both side surfaces of the battery cell 12 in the overlapping direction). A partition portion 24 is formed on the upper end of the separator 22 so as to protrude upward in relation to the top surface of the battery cell 12. The partition portion 24 is inserted into a partition insertion portion 45 formed as a slit or a through-hole formed between the adjacent busbars 32. The partition insertion portion 45 is formed in an elongated rectangular shape in accordance with the shape of the plate-shaped partition portion 24. Since the partition portion 24 protrudes upward in relation to the partition insertion portion 45 (in the electrode terminal protruding direction), the short-circuiting between the electrode terminals caused by a tool is prevented. The partition insertion portion 45 is formed between the adjacent busbars 32A and between the busbar 32A and the busbar 32B adjacent to each other in the battery wiring module 30A. The partition insertion portion 45 is formed between the adjacent busbars 32A in the battery wiring module 30B. The partition insertion portion 45 is used to separate the adjacent busbars 32 from each other.

Figure 2:
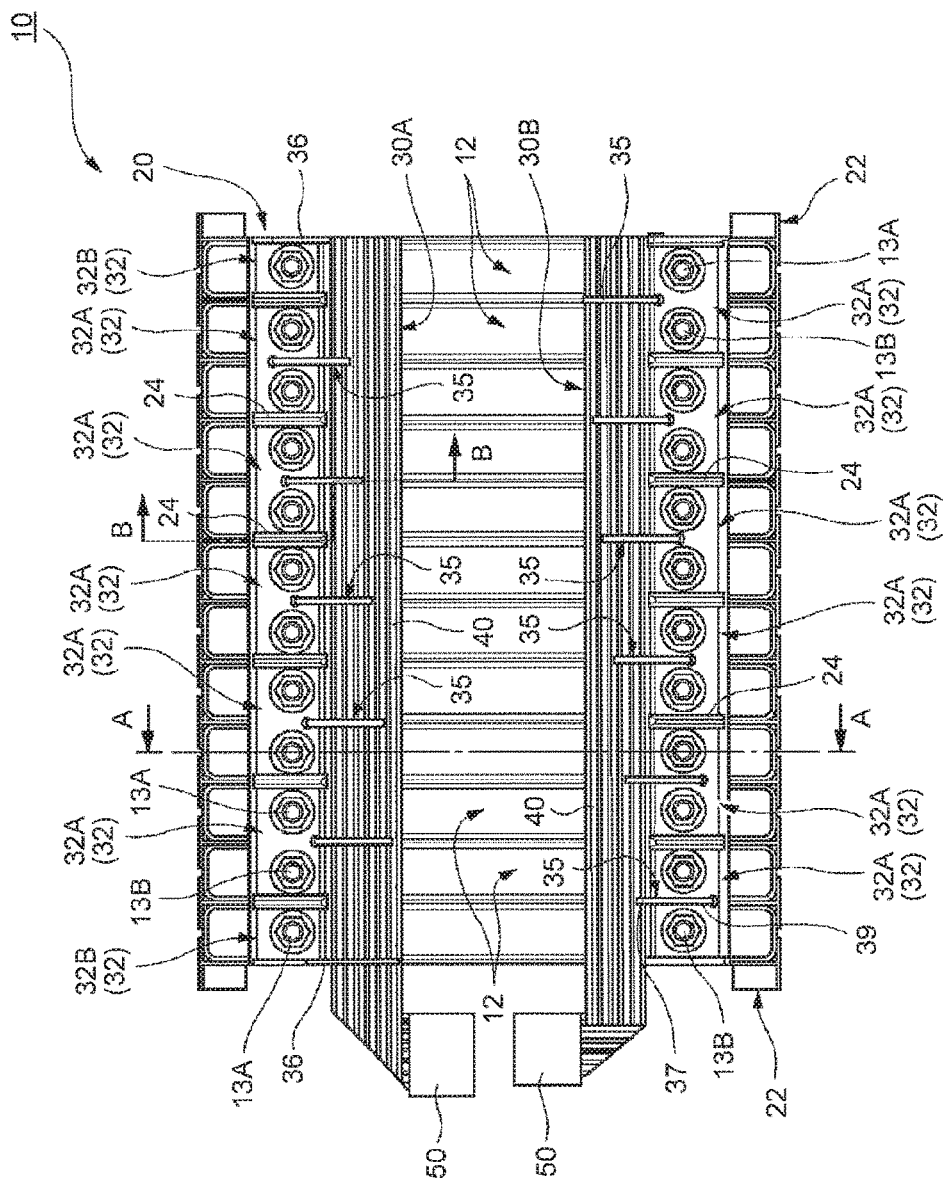
FIG. 2 is a top view of the battery pack illustrated in FIG. 1.

As illustrated in FIG. 2, the belt-shaped battery wiring modules 30A and 30B extending in the arrangement direction of the battery cells 12 (the overlapping direction of the battery cells 12) are disposed on the plurality of battery cells 12. Each of the battery wiring modules 30A and 30B is disposed in each row of the electrode terminals. The battery wiring module 30A includes a voltage detection line 40 including a linear conductor 21 electrically connected to the predetermined busbars 32A and 32B and a busbar row including the plurality of busbars 32A and two busbars 32B. In the busbar row of the battery wiring module 30A, the busbars 32A are arranged in the arrangement direction of the battery cell 12, and the busbar 32B is disposed at each of both ends in the arrangement direction. The two busbars 32B are respectively connected to one-side electrode terminals disposed at both ends in the overlapping battery cells 12. One busbar 32B is a cathode busbar which is electrically connected only to the cathode terminal 13A. The other busbar 32B is an anode busbar which is electrically connected only to the anode terminal 13B. Further, the battery wiring module 30B includes the voltage detection line 40 including the linear conductor 21 electrically connected to the predetermined busbar 32A and the busbar row including the plurality of busbars 32A. In the busbar row of the battery wiring module 30B, the busbars 32A are arranged in the arrangement direction of the battery cells 12. In the voltage detection lines 40, the linear conductors 21 are disposed in parallel so that the axis direction follows the arrangement direction of the battery cells 12 (that is, a direction following the busbar row) and a predetermined gap is formed therebetween. The voltage detection line 40 is disposed so that a predetermined gap is formed with respect to the busbar row. That is, a predetermined gap is formed between the busbar row and the linear conductor 21 closest to the busbar row.

Figure 4:
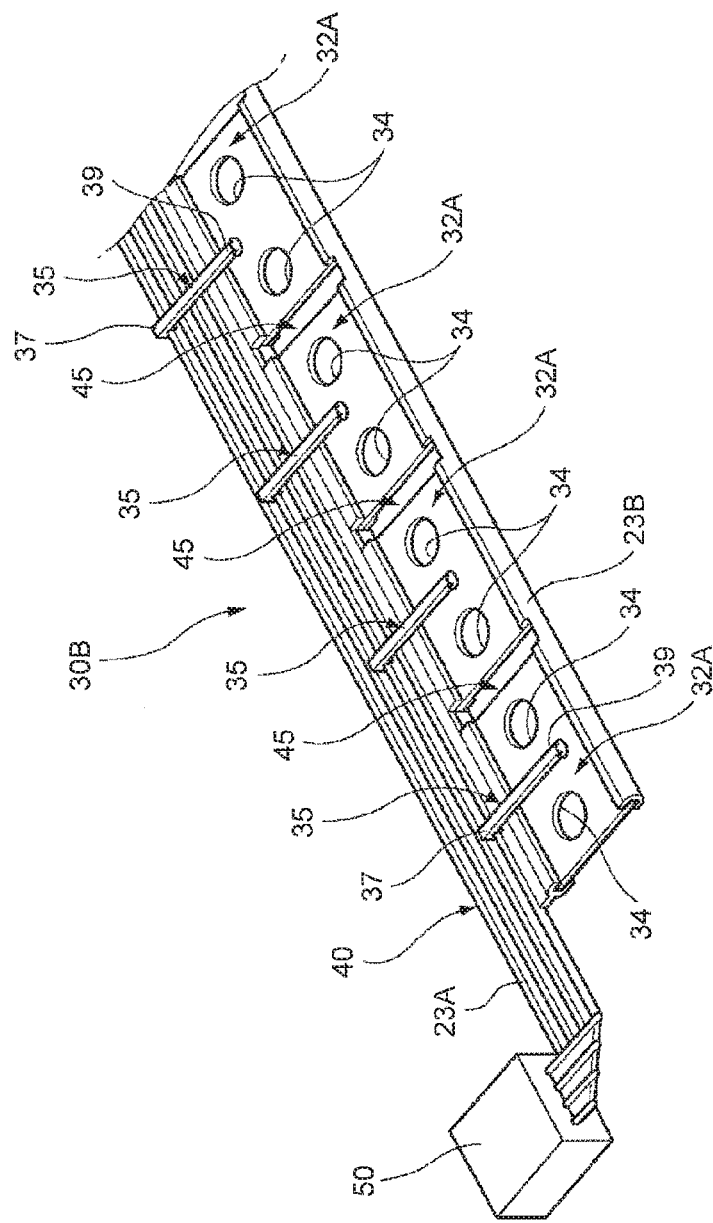
FIG. 4 is a partially perspective view of the battery wiring module illustrated in FIG. 1.

The busbar 32A is provided with one terminal insertion hole 34 through which the cathode terminal 13A is inserted and one terminal insertion hole 34 through which the anode terminal 13B is inserted in the arrangement direction of the battery cells 12 (FIG. 4). FIG. 4 is a diagram in which the battery wiring module 30B is exemplified. Further, in the battery wiring module 30A, the terminal insertion hole 34 of the cathode terminal 13A is formed at one busbar 32B, and the terminal insertion hole 34 of the anode terminal 13B is formed at the other busbar 32B. In the battery wiring module 30A of this example, two busbars 32B are disposed so as to interpose five busbars 32A therebetween. Meanwhile, six busbars 32A are arranged in the battery wiring module 30B.

Figure 5A:
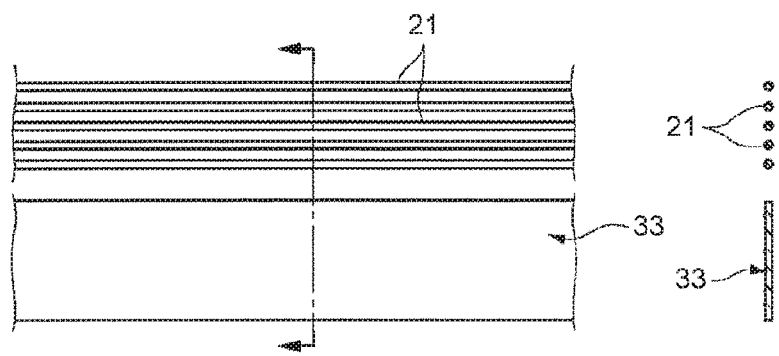
FIG. 5A is a main top view and a cross-sectional view illustrating a step of arranging the battery wiring module illustrated in FIG. 1.
Figure 5B:
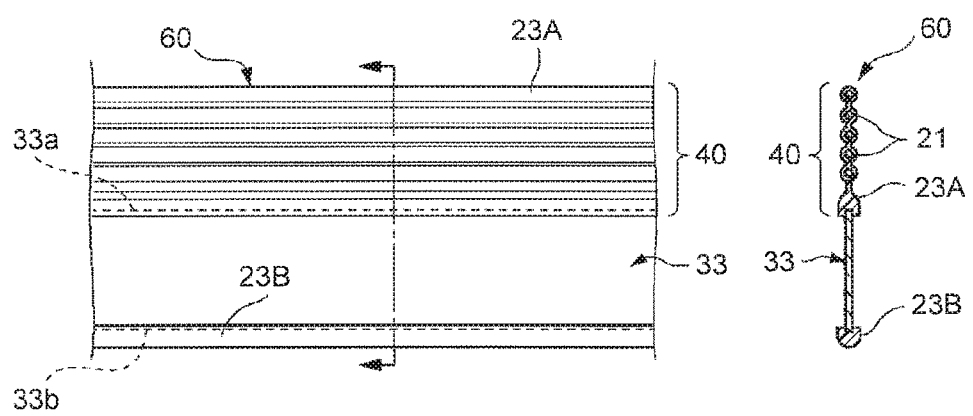
FIG. 5B is a main top view and a cross-sectional view illustrating a step of coating the battery wiring module illustrated in FIG. 1.
Figure 5C:
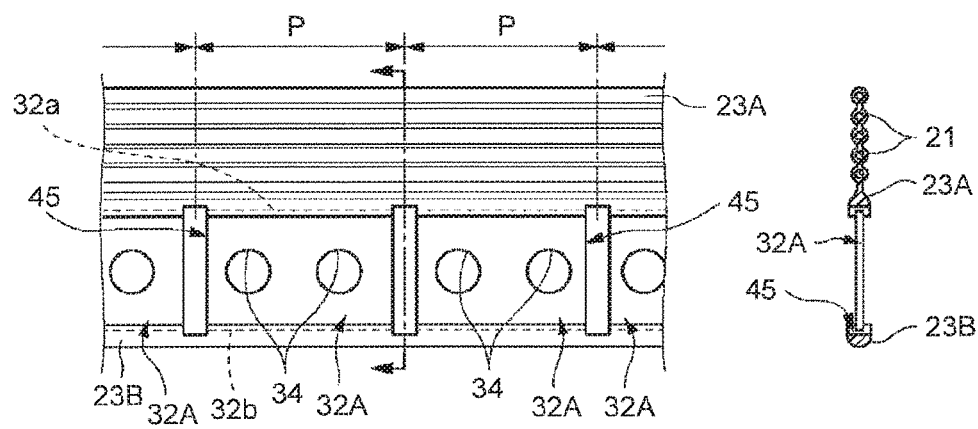
FIG. 5C is a main top view and a cross-sectional view illustrating a step of pressing the battery wiring module illustrated in FIG. 1.
Figure 5D:
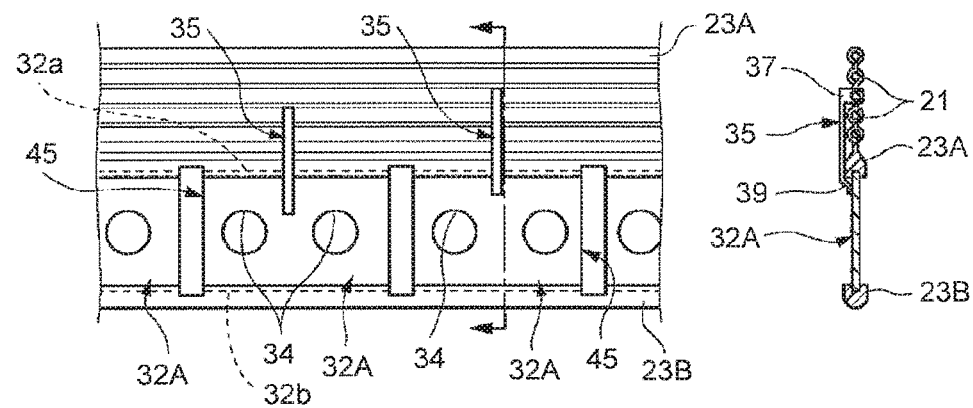
FIG. 5D is a main top view and a cross-sectional view illustrating a step of connecting the battery wiring module illustrated in FIG. 1.
Figure 6:
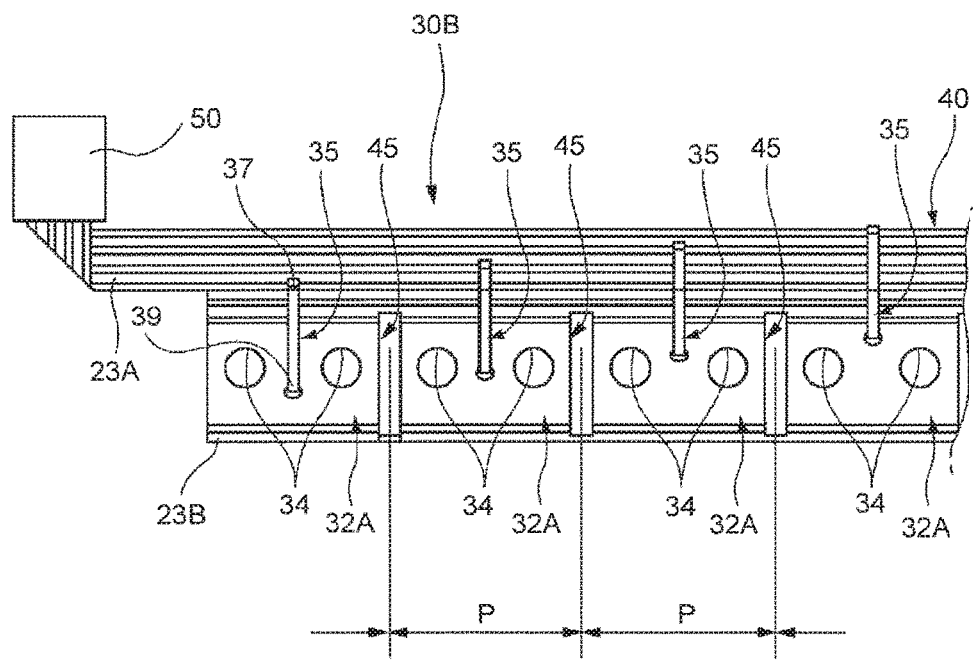
FIG. 6 is a partial top view of the battery wiring module.

As illustrated in FIGS. 4 to 6, each of the busbars 32A and 32B has a substantially rectangular shape, and the electrode terminal is inserted through the terminal insertion hole 34. The busbars 32A and 32B are formed by punching an elongated rectangular flat plate conductor 33 as a plate member formed of metal such as copper, copper alloy, aluminum, aluminum alloy, gold, and stainless steel (SUS) in a pressing step to be described below. Plating of Sn, Ni, Ag, or Au may be performed on the busbars 32A and 32B in order to improve the weldability. In the busbars 32A and 32B of the embodiment, nuts 15 are screw-connected to the cathode terminal 13A and the anode terminal 13B inserted through the terminal insertion holes 34 and are fastened. Accordingly, the busbars 32A and 32B are electrically connected to the cathode terminal 13A or the anode terminal 13B. Of course, the busbar according to the present invention may be welded to the cathode terminal and the anode terminal without forming the terminal insertion hole 34 so that an electrical connection is made. In addition, the busbars 32A and 32B may be decreased in weight by forming the corner portions in, for example, a circular-arc shape in response to the circular terminal insertion hole 34.

The voltage detection line 40 constituting the battery wiring modules 30A and 30B is formed in a flat cable shape including the plurality of linear conductors 21 disposed in parallel with a predetermined gap therebetween and an insulating resin portion (a first insulating resin portion 23A) collectively coating the outer peripheral portions of the plurality of linear conductors 21. The first insulating resin portion 23A is formed of, for example, insulating resin such as polypropylene (PP), polyvinyl chloride (PVC), polybutylene terephthalate (PBT), and polyethylene terephthalate (PET). In this example, insulating resin is extrude-molded along with the plurality of linear conductors 21 in a coating step to be described later while covering the outer peripheral portions of the linear conductors 21 so that the first insulating resin portion 23A integrated with these outer peripheral portions is formed. As the linear conductor 21, a stranded wire or a single wire of a flat conductor and a round conductor can be variously used. Further, copper alloy or aluminum alloy is used in the linear conductor 21.

In the battery wiring modules 30A and 30B, the voltage detection line 40 is disposed in at least one of two side edge portions 32a and 32b extending in the arrangement direction of the battery cells 12 in the busbar 32 (32A and 32B). In other words, the busbars 32 (32A and 32B) are disposed in parallel along at least one of the linear conductors 21 disposed at both ends of the voltage detection line 40. The plurality of linear conductors 21 of the battery wiring modules 30A and 30B of this example is disposed in parallel so that a predetermined gap is formed with respect to the side edge portion 32a of the busbar 32 and a predetermined gap is formed along the side edge portion 32a. In the battery wiring modules 30A and 30B, the outer peripheral portions of the plurality of linear conductors 21 and the side edge portion 32a of the busbar 32 adjacent to one of the plurality of linear conductors 21 are coated by the first insulating resin portion 23A. Further, in the battery wiring module 30A, an insulating resin portion (a second insulating resin portion 23B) is also formed in the opposite side edge portion 32b facing the side edge portion 32a of the busbar 32. The second insulating resin portion 23B serves as a connection portion connecting the busbars 32 of the battery wiring modules 30A and 30B, and integrally connect the opposite side edge portions 32b while extending in the arrangement direction of the battery cells 12. The second insulating resin portion 23B is formed of the same insulating resin as the first insulating resin portion 23A. In this example, the second insulating resin portion 23B is also extrude-molded along with the first insulating resin portion 23A. In the battery wiring modules 30A and 30B, the busbars 32 are held by the first insulating resin portion 23A and the second insulating resin portion 23B. For this reason, even when the first insulating resin portion 23A and the second insulating resin portion 23B are molded by flexible insulating resin, a positional deviation between the busbars 32 (a variation in each of the busbar 32) can be suppressed. Therefore, the battery wiring modules 30A and 30B can prevent degradation in connection force between the busbar 32 and the voltage detection line 40 and improve the assembling workability with respect to the battery module 20. Thus, it is desirable to use a through-hole as the partition insertion portion 45. Of course, when the connection force between the voltage detection line 40 and the busbar 32 is sufficient, it is needless to mention that the second insulating resin portion 23B as the connection portion can be omitted.

Figure 3A:
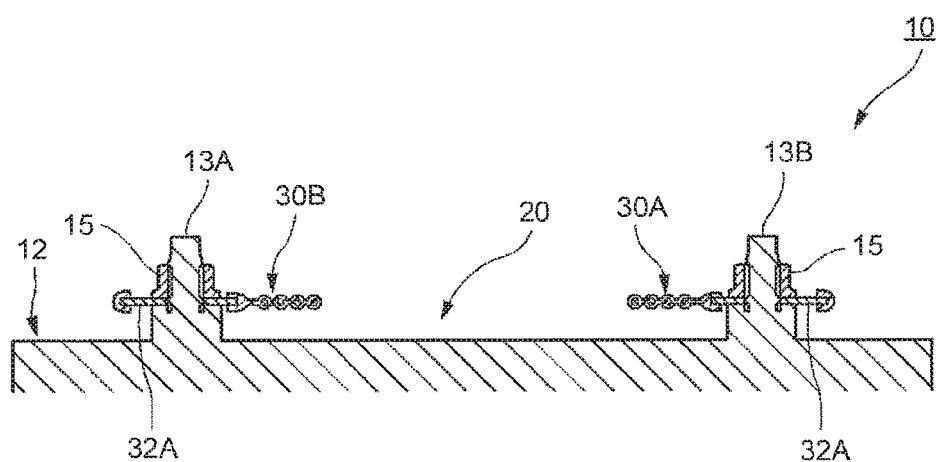
FIG. 3A is a main cross-sectional view of the battery pack taken along the line A-A of FIG. 2.
Figure 3B:
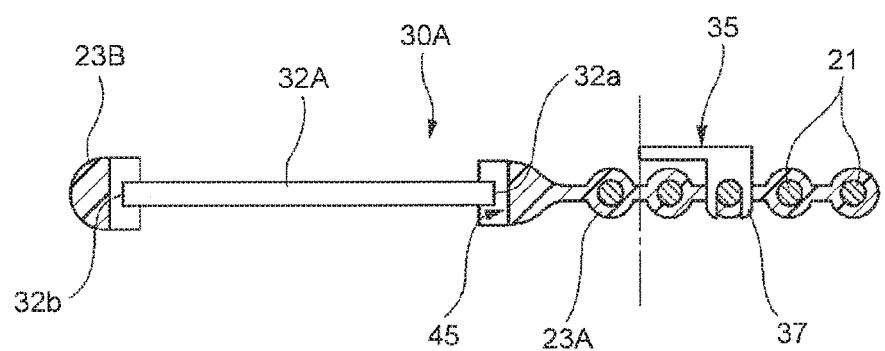
FIG. 3B is a cross-sectional view of the battery wiring module taken along the line B-B of FIG. 2.

The busbars 32A of the battery wiring modules 30A and 30B are electrically connected to the cathode terminal 13A and the anode terminal 13B adjacent to each other and are electrically connected to the corresponding linear conductor 21 of the voltage detection line 40 which detects the voltage of the battery cell 12. The busbar 32A and the linear conductor 21 are electrically connected to each other by a connection conductor 35 as an electric connection portion. The connection conductor 35 is formed by punching a metallic member so that a pressure-contact blade portion (a press-contact connection portion) 37 is provided at one end of a body and a welded portion 39 is provided at the other end thereof. Then, as illustrated in FIG. 3B, the connection conductor 35 is formed so that the pressure-contact blade portion 37 is press-connected to the predetermined linear conductor 21 and the welded portion 39 is weld-connected to the predetermined busbar 32A (see FIG. 4). In addition, the "weld-connection" of the embodiment includes various kinds of publicly known weld-connection such as spot-welding, ultrasonic-welding, and laser-welding. Further, the connection conductor is not limited to the connection conductor 35 having the pressure-contact blade portion 37 formed at one end thereof and may be variously chosen as the electric wire or the busbar based on the spirit of the embodiment.

Figure 7B:
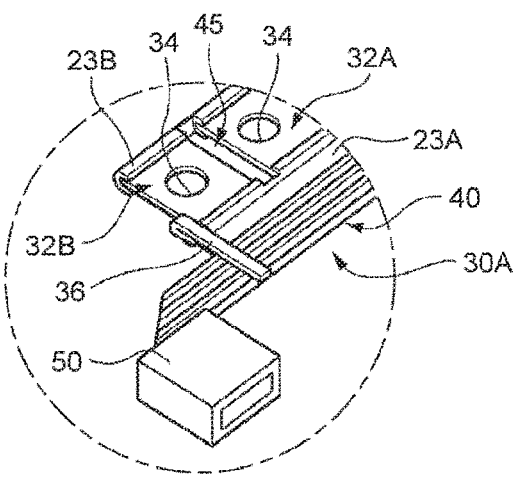
FIG. 7B is an enlarged view of a part Y of FIG. 7A.

Further, one busbar 32B of the battery wiring module 30A is electrically connected to the cathode terminal 13A of the battery cell 12 at one end in the overlapping direction. Further, the other busbar 32B is electrically connected to the anode terminal 13B of the battery cell 12 at the other end in the overlapping direction. Further, the busbar 32B is electrically connected to a predetermined linear conductor 21 which measures the voltage of the battery cell 12. The busbar 32B and the linear conductor 21 are electrically connected to each other by a cut raised portion 36 as an electric connection portion formed at the side edge of the busbar 32B (the outer edge portion in the arrangement direction of the battery cells 12). The cut raised portion 36 is formed so as to be bent along the side edge of the busbar 32B, and the front end is weld-connected to a predetermined linear conductor 21 (see FIG. 7B). When the protruding position of the front end is changed by appropriately changing the bent position of the cut raised portion 36, a predetermined linear conductor 21 to which the front end is welded can be selected. Further, when the welding position is appropriately changed without changing the bent position of the cut raised portion 36, a predetermined linear conductor 21 of which an intermediate portion is welded can be selected.

Next, a method for manufacturing the battery wiring modules 30A and 30B with the above-described configuration will be described. In addition, the battery wiring modules 30A and 30B are manufactured by the substantially same manufacturing steps unless otherwise specified. In the drawing, the battery wiring module 30B will be exemplified. The method for manufacturing the battery wiring modules 30A and 30B of the embodiment includes: a coating step of coating one long side portion 33a (a base portion of the side edge portion 32a) of the elongated flat plate conductor 33 and outer peripheral portions of the plurality of linear conductors 21 disposed in parallel along the long side portion 33a with a predetermined gap therebetween while having a predetermined gap with respect to the long side portion 33a by the first insulating resin portion 23A; a pressing step of separating the flat plate conductor 33 at a predetermined gap in the longitudinal direction of the flat plate conductor 33 and forming the plurality of busbars 32A electrically connecting the electrode terminals provided in at least two battery cells 12 connected to each other in the same direction among the plurality of battery cells 12 overlapping each other in the same direction, the electrode terminals being arranged in the same direction; and a connecting step of electrically connecting each of the plurality of linear conductors 21 to a predetermined busbar 32A. Precisely, a step of arranging members at a predetermined positional relation exists before the coating step.

First, the arranging step and the coating step illustrated in FIGS. 5A and 5B will be described. In the arranging step, a plurality of reels on which base materials of the linear conductors 21 are respectively wound and a reel on which base materials of the flat plate conductor 33 is wound are coaxially set in a publicly known extruder. The extruder is used to extrude-mold the first insulating resin portion 23A and the second insulating resin portion 23B on the base materials while the base materials of the plurality of linear conductors 21 and the base material of the flat plate conductor 33 are disposed in parallel at a predetermined gap and are drawn from the reels. That is, the extruder performs the arranging step and the coating step during a series of steps. In the arranging step, the base materials are fed to a die opening while being drawn from the reels and the base materials of the plurality of linear conductors 21 and the base material of the flat plate conductor 33 are arranged in parallel at the above-described predetermined gap in the die opening. Then, in the coating step, the first insulating resin portion 23A covering the outer peripheral portions of the plurality of linear conductors 21 and one long side portion 33a of the flat plate conductor 33 forming the side edge portion 32a and the second insulating resin portion 23B covering the other long side portion 33b of the flat plate conductor 33 forming the side edge portion 32b are extrude-molded by an extruding die having a die opening. Accordingly, in the coating step, the outer peripheral portions of the plurality of linear conductors 21 and one long side portion 33a of the flat plate conductor 33 are coated by the first insulating resin portion 23A, and the other long side portion 33b of the flat plate conductor 33 is coated by the second insulating resin portion 23B. Thus, in the arranging step and the coating step, an elongated flat circuit body 60 is formed in which the flat plate conductor 33 and the plurality of linear conductors 21 forming the flat cable-shaped voltage detection line 40 are integrally arranged in parallel (see FIG. 5B).

Next, the pressing step illustrated in FIG. 5C will be described. In the pressing step, after the flat circuit body 60 is cut in a desired longitudinal length, and the plurality of partition insertion portions 45 and the terminal insertion holes 34 are punched at a predetermined gap P in the longitudinal direction of the flat plate conductor 33 of the flat circuit body 60 so as to form the plurality of busbars 32A. At this time, the length of the partition insertion portion 45 in the longitudinal direction is set so that the adjacent busbars 32A are reliably separated from each other. Further, in the step of pressing the battery wiring module 30A, two busbars (the cathode busbar and the anode busbar) 32B are formed along with the terminal insertion hole 34 by the punching of the partition insertion portion 45 and the punching of the terminal insertion hole 34. In the battery wiring module 30A, the length of the partition insertion portion 45 in the longitudinal direction is set so that the busbars 32A and the busbar 32B adjacent to each other are reliably separated from each other. Then, in the step of pressing the battery wiring module 30A, the cut raised portion 36 is also formed in each of two busbars 32B. Further, in the pressing step, the pressing operation can be performed at the same time by appropriately changing a gap P between the partition insertion portions 45, a gap between the pair of terminal insertion holes 34 of the busbar 32A, or the inner diameter of the terminal insertion hole 34 of the busbar 32 in response to the size of the battery cell 12 or others. For this reason, in the pressing step, various different battery wiring modules 30A and 30B can be easily formed by one kind of flat circuit body 60.

Next, the connecting step illustrated in FIG. 5D will be described. In the connecting step, the plurality of linear conductors 21 is electrically connected to the predetermined busbars 32A by the connection conductor 35. In the connecting step, one end of the connection conductor 35 is press-connected to the predetermined linear conductor 21 coated by the first insulating resin portion 23A, and the other end of the connection conductor 35 is electrically connected to the predetermined busbar 32A. Specifically, the connection conductor 35 is formed so that the pressure-contact blade portion 37 formed at one end of the body is press-connected to the predetermined linear conductor 21 and the welded portion 39 formed at the other end of the body is weld-connected to the predetermined busbar 32A. Further, in the step of connecting the battery wiring module 30A, the cut raised portion 36 is electrically connected to the predetermined linear conductor 21 coated by the first insulating resin portion 23A. Specifically, the front end of the cut raised portion 36 is weld-connected to the predetermined linear conductor 21. In the connecting step, the connector 50 is connected and fixed to one end of the voltage detection line 40. In the embodiment, the battery wiring modules 30A and 30B are completed in this way.

The battery wiring modules 30A and 30B with such a configuration can be placed on each row of the electrode terminals of the battery module 20 obtained by overlapping twelve battery cells 12.

Next, as illustrated in FIG. 7A, in the battery wiring modules 30A and 30B, the electrode terminals (the cathode terminal 13A and the anode terminal 13B) as the connection objects are inserted through all terminal insertion holes 34 of the busbar 32, and the partition portion 24 of the separator 22 is inserted through the partition insertion portion 45.

Then, the nuts 15 are screw-connected to the cathode terminal 13A and the anode terminal 13B protruding from the terminal insertion holes 34 and are fastened. The busbar 32 is fixed to the electrode terminals (the cathode terminal 13A and the anode terminal 13B) by the fastening of the nuts 15 and is electrically connected to the electrode terminals. The battery pack 10 is completely obtained in a manner such that the nuts 15 are fastened to the cathode terminal 13A and the anode terminal 13B and the battery wiring modules 30A and 30B are provided in the battery module 20.

As described above, each of the battery wiring modules 30A and 30B according to the embodiment includes a plurality of busbars 32 arranged with a predetermined gap therebetween so as to match the arrangement of the electrode terminals of the battery cells 12 and a plurality of linear conductors 21 arranged with a predetermined gap therebetween along the busbar row and electrically connected to the corresponding busbars 32. Then, in the battery wiring modules 30A and 30B, the outer peripheral portions of the plurality of linear conductors 21 and the side edge portions 32a of the plurality of busbars 32 are integrally coated by the first insulating resin portion 23A. That is, in the battery wiring modules 30A and 30B, the plurality of busbars 32 connected through the first insulating resin portion 23A is integrally arranged with a predetermined gap therebetween along the plurality of linear conductors 21. For this reason, in the battery wiring modules 30A and 30B, it is possible to omit an insulation member such as an insulation frame for disposing the plurality of busbars 32A and 32B in the battery module 20 while suppressing degradation in attachment workability when the battery wiring module is combined with the battery module 20. Thus, since the battery wiring modules 30A and 30B do not require an insulation member dedicated for each type of the battery pack 10, the versatility can be improved and the manufacturing cost can be decreased.

Further, in the battery wiring module 30A according to the embodiment, the front end of the cut raised portion 36 bent in the side edge of the busbar 32B is weld-connected to the predetermined linear conductor 21 of the voltage detection line 40. For this reason, in the battery wiring module 30A, the predetermined busbar 32B and the linear conductor 21 can be electrically connected to each other by a simple operation in which the front end of the cut raised portion 36 formed in the busbar 32B is welded to the predetermined linear conductor 21.

Further, in the battery wiring modules 30A and 30B according to the embodiment, the pressure-contact blade portion 37 of one end of the connection conductor 35 is press-connected to the predetermined linear conductor 21 of the plurality of linear conductors 21 coated by the first insulating resin portion 23A, and the welded portion 39 of the other end is weld-connected to the predetermined busbar 32A. For this reason, in the battery wiring modules 30A and 30B, the predetermined linear conductor 21 and the busbar 32A can be electrically connected to each other by a simple operation in which the pressure-contact blade portion 37 formed at one end of the connection conductor 35 is press-connected to the linear conductor 21 and the welded portion 39 formed at the other end of the connection conductor 35 is weld-connected to the busbar 32A.

Further, in the method for manufacturing the battery wiring modules 30A and 30B according to the embodiment, since the outer peripheral portions of the plurality of linear conductors 21 and one long side portion 33a of the elongated flat plate conductor 33 are coated by the first insulating resin portion 23A extruded at the same time and the other long side portion 33b of the flat plate conductor 33 is coated by the second insulating resin portion 23B extruded at the same time in the coating step, the elongated flat circuit body 60 in which the plurality of linear conductors 21 and the flat plate conductor 33 are integrally arranged in parallel is formed. Since the flat circuit body 60 is continuously formed by an extrude-molding operation of a publicly known extruder (not illustrated), the manufacturing cost can be easily decreased.

Then, in the method for manufacturing the battery wiring modules 30A and 30B, when the plurality of partition insertion portions 45 is formed while being punched in the flat circuit body 60 at a predetermined gap P in the longitudinal direction of the flat plate conductor 33 in the pressing step, the plurality of busbars 32 connected through the first insulating resin portion 23A and the second insulating resin portion 23B is integrally disposed along the plurality of linear conductors 21. Further, in the pressing step, the terminal insertion hole 34 is formed in the busbar 32.

For this reason, in the pressing step, it is possible to easily form the plurality of busbars 32A and 32B of which the gap p between the partition insertion portions 45, the gap between the pair of terminal insertion holes 34 of the busbar 32A, or the inner diameter of the terminal insertion hole 34 of the busbar 32 is appropriately changed in response to the size of the battery cell 12 or others. Thus, in the manufacturing method, it is possible to obtain the battery wiring modules 30A and 30B having extremely high versatility.

Second Embodiment

Next, a battery wiring module 80 according to a second embodiment of the present invention will be described. In the embodiment, a form of connecting the busbar 32A and the linear conductor 21 in the battery wiring modules 30A and 30B of the first embodiment is changed. For this reason, in the description of the embodiment below, a description will be made by exemplifying the battery wiring module 30B of the first embodiment. Accordingly, the same reference numerals will be given to the same components as the battery wiring module 30B, and the repetitive description thereof will be omitted. In addition, the battery wiring module 80 according to the embodiment is exemplified based on the configuration of the battery wiring module 30B including one kind of busbar 32A. However, the same applies to the configuration based on the battery wiring module 30A including two kinds of busbars 32A and 32B.

In the battery wiring module 80 according to the embodiment, the elongated flat circuit body 60 is formed in the arranging step and the coating step similarly to the battery wiring module 30B of the first embodiment (see FIG. 5B). Then, the flat circuit body 60 is cut in a desired longitudinal length. Subsequently, in the pressing step, the plurality of partition insertion portion 45 and the terminal insertion holes 34 are punched in the flat circuit body 60 in the longitudinal direction of the flat plate conductor 33. At that time, as illustrated in FIG. 8A, four busbars 32A remain and the other portion of the flat plate conductor 33 and a part of the voltage detection line 40 connected thereto are punched.

In a remaining portion 85 of the voltage detection line 40 partially punched along with the other portion of the flat plate conductor 33, the protrusion length thereof increases as the gap between the busbar 32A and the plurality of linear conductors 21 coated by the first insulating resin portion 23A increases.

Figure 8B:
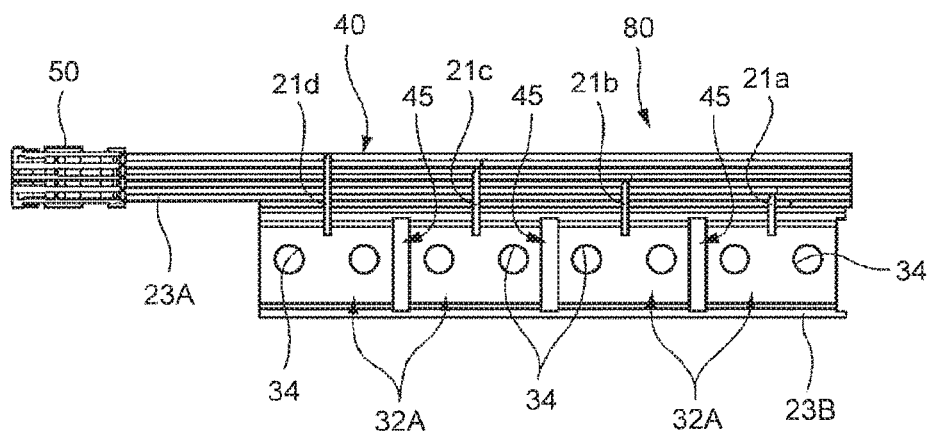
FIG. 8B is a top view of the battery wiring module subjected to the connecting step according to the second embodiment of the present invention.

Next, as illustrated in FIG. 8B, in the connecting step, the gap between the plurality of linear conductors 21 at one end of the first insulating resin portion 23A is cut and the linear conductor 21 at one end is electrically connected to the predetermined busbar 32A. Specifically, the first insulating resin portion 23A between the linear conductors 21 in the remaining portion 85 is cut, and the remaining portion 85 is folded to the voltage detection line 40. Then, in the connecting step, ends 21a, 21b, 21c, and 21d of each linear conductor 21 in the remaining portion 85 are bent orthogonally toward the predetermined busbar 32A, and the ends 21a, 21b, 21c, and 21d are weld-connected to the predetermined busbar 32A. That is, in this example, the ends 21a, 21b, 21c, and 21d serve as the electric connection portions electrically connecting the linear conductor 21 and the predetermined busbar 32A to each other. After the welding connection, the connector 50 is connected and fixed to one end of the voltage detection line 40 in the connecting step. Accordingly, the battery wiring module 80 is completed. In addition, the ends 21a, 21b, 21c, and 21d are formed at the opposite side to the connection side of the connector 50 and are formed at the free end side in the remaining portion 85.

Thus, in the battery wiring module 80 according to the embodiment, the predetermined linear conductor 21 and the busbar 32A can be electrically connected to each other by a simple operation in which the first insulating resin portion 23A between the linear conductors 21 in the remaining portion 85 is cut and the ends 21a, 21b, 21c, and 21d of the linear conductor 21 in the remaining portion 85 are weld-connected to the busbar 32A.

Third Embodiment

Next, a battery wiring module 90 according to a third embodiment of the present invention will be described. In the embodiment, a form of connecting between the busbar 32A and the linear conductor 21 in the battery wiring modules 30A and 30B of the first embodiment is changed. For this reason, in the description of the embodiment below, a description will be made by exemplifying the battery wiring module 30B of the first embodiment. Accordingly, the same reference numerals will be given to the same components as the battery wiring module 30B, and the repetitive description thereof will be omitted. In addition, the method for manufacturing the battery wiring module 90 according to the embodiment is exemplified based on the configuration of the battery wiring module 30B including one kind of busbar 32A. However, the same applies to the configuration based on the battery wiring module 30A including two kinds of busbars 32A and 32B.

Figure 9A:
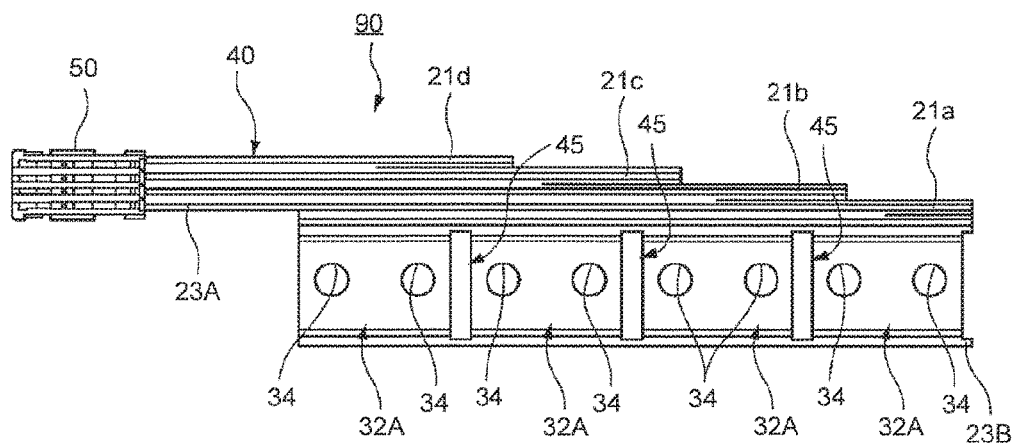
FIG. 9A is a top view of a battery wiring module before a connecting step according to a third embodiment of the present invention.

In the battery wiring module 90 according to the embodiment, the elongated flat circuit body 60 is formed in the arranging step and the coating step similarly to the battery wiring module 30B of the first embodiment (see FIG. 5B). Then, the flat circuit body 60 is cut in a desired longitudinal length. Subsequently, in the pressing step, the plurality of partition insertion portion 45 and the terminal insertion holes 34 are punched in the flat circuit body 60 in the longitudinal direction of the flat plate conductor 33. At that time, as illustrated in FIG. 9A, four busbars 32A remain and the other portion of the flat plate conductor 33 and a part of the voltage detection line 40 connected thereto are punched.

In the remaining voltage detection line 40 partially punched along with the other portion of the flat plate conductor 33, the length thereof increases as the gap between the busbar 32A and the plurality of linear conductors 21 coated by the first insulating resin portion 23A increases.

Figure 9B:
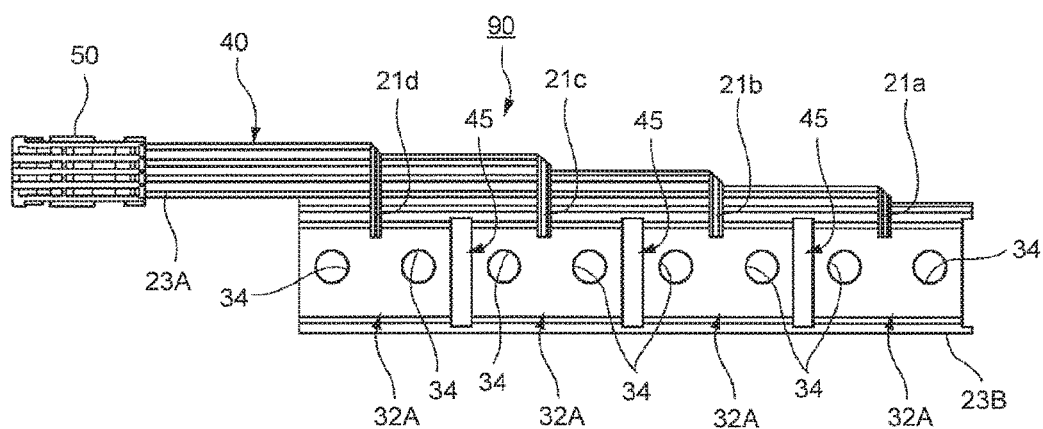
FIG. 9B is a top view of the battery wiring module subjected to the connecting step according to the third embodiment of the present invention.

Next, as illustrated in FIG. 9B, in the connecting step, the gap between the plurality of linear conductors 21 of one end of the first insulating resin portion 23A is cut and the linear conductor 21 of the one end is electrically connected to the predetermined busbar 32A similarly to the second embodiment. Specifically, when the first insulating resin portion 23A between the linear conductors 21 at one end of the remaining voltage detection line 40 is cut, the ends 21a, 21b, 21c, and 21d separated from the adjacent linear conductor 21 are formed. The ends 21a, 21b, 21c, and 21d of the linear conductor 21 are formed at the opposite side to the end connected to the connector 50. Then, in the connecting step, the ends 21a, 21b, 21c, and 21d are respectively bent toward the predetermined busbar 32A and the ends 21a, 21b, 21c, and 21d are weld-connected to the predetermined busbar 32A. That is, in this example, the ends 21a, 21b, 21c, and 21d serve as the electric connection portions electrically connecting the linear conductor 21 and the predetermined busbar 32A to each other. After the welding connection, the connector 50 is connected and fixed to one end of the voltage detection line 40 in the connecting step. Accordingly, the battery wiring module 90 is completed.

Thus, in the battery wiring module 90 according to the embodiment, the predetermined linear conductor 21 and the busbar 32A can be electrically connected to each other by a simple operation in which the first insulating resin portion 23A between the linear conductors 21 is cut and the ends 21a, 21b, 21c, and 21d of the linear conductor 21 are welded to the busbar 32A.

Fourth Embodiment

Next, a battery wiring module 100 according to a fourth embodiment of the present invention will be described. In the embodiment, the connection force between the first insulating resin portion 23A and the busbar 32A in the battery wiring modules 30A and 30B of the first embodiment is increased. For this reason, in the description of the embodiment below, a description will be made by exemplifying the battery wiring module 30B of the first embodiment. Accordingly, the same reference numerals will be given to the same components as the battery wiring module 30B, and the repetitive description thereof will be omitted. In addition, the battery wiring module 100 according to the embodiment is exemplified based on the configuration of the battery wiring module 30B including one kind of busbar 32A. However, the same applies to the configuration based on the battery wiring module 30A including two kinds of busbars 32A and 32B. As illustrated in FIGS. 10A to 10C and FIGS. 11A to 11C, the battery wiring module 100 of the embodiment is formed by a manufacturing method including: causing a coating step of coating one long side portion 33a of an elongated rectangular flat plate conductor 33A and the outer peripheral portions of the plurality of linear conductors 21 disposed in parallel along the long side portion 33a with a predetermined gap therebetween while having a predetermined gap with respect to the long side portion 33a by the first insulating resin portion 23A; causing a pressing step of separating the flat plate conductor 33A with a predetermined gap in the longitudinal direction of the flat plate conductor 33A and forming a plurality of busbars 32C electrically connecting the electrode terminals provided in at least two battery cells 12 connected to each other in the same direction among the plurality of battery cells 12 overlapping each other in the same direction, the electrode terminals being arranged in the same direction; and causing a connecting step of electrically connecting the plurality of linear conductors 21 to the predetermined busbars 32C. Precisely, an arranging step of arranging components at a predetermined positional relation exists before the coating step.

First, the arranging step and the coating step illustrated in FIGS. 10A, 10B, 11A, and 11B will be described. The arranging step is performed similarly to the first embodiment. For this reason, in the arranging step, the base materials of the plurality of linear conductors 21 drawn from the reels and the base material of the flat plate conductor 33A are disposed in parallel with a predetermined gap therebetween. Then, in the coating step, the first insulating resin portion 23A covering the outer peripheral portions of the plurality of linear conductors 21 and one long side portion 33a of the flat plate conductor 33A and the second insulating resin portion 23B covering the other long side portion 33b of the flat plate conductor 33A are extrude-molded by an extruding die having a die opening. Accordingly, in the arranging step and the coating step, an elongated flat circuit body 60A is formed in which the flat plate conductor 33A and the plurality of linear conductors 21 forming the flat cable-shaped voltage detection line 40 are integrally arranged in parallel (see FIG. 10B).

Here, in the embodiment, a connection reinforcement portion for increasing the connection force between the first insulating resin portion 23A and the busbar 32C is formed before the coating step. That is, in the manufacturing method for the embodiment, a step of forming the connection reinforcement portion is provided before the coating step. The connection reinforcement portion forming step may be provided between the arranging step and the coating step or may be provided before the base material of the flat plate conductor 33A is wound as a reel. The connection reinforcement portion is provided as a through-hole 38 at a plurality of positions in one long side portion 33a of the flat plate conductor 33A. The through-holes 38 are formed a predetermined gap therebetween along the long side portion 33a (the longitudinal direction). In this example, two through-holes 38 are provided in the busbar 32C. Further, although not illustrated in the drawings, at least one through-hole 38 may be provided in the busbar 32B. Thus, in the coating step, insulating resin forming the first insulating resin portion 23A also enters the through-hole 38. For this reason, in the battery wiring module 100, the connection force between the first insulating resin portion 23A and the busbar 32C is improved.

Figure 10A:
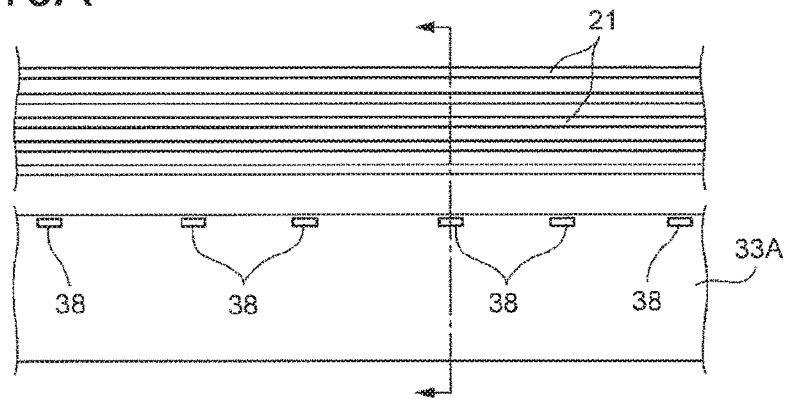
FIG. 10A is a main top view illustrating a step of arranging a battery wiring module according to a fourth embodiment of the present invention.
Figure 10B:
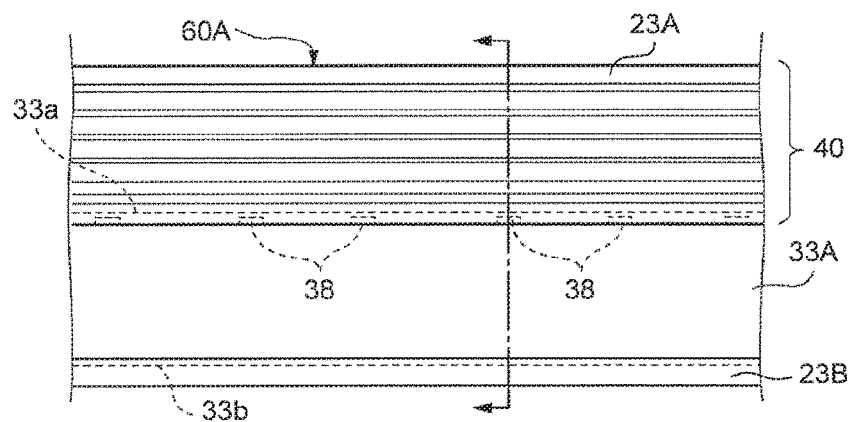
FIG. 10B is a main top view illustrating a step of coating the battery wiring module according to the fourth embodiment of the present invention.
Figure 10C:
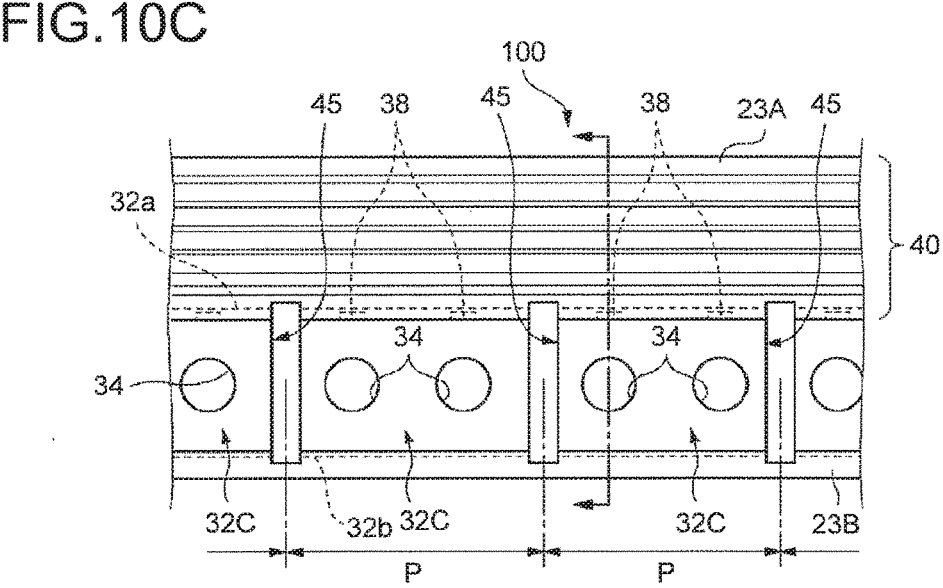
FIG. 10C is a main top view illustrating a step of pressing the battery wiring module according to the fourth embodiment of the present invention.
Figure 11A:
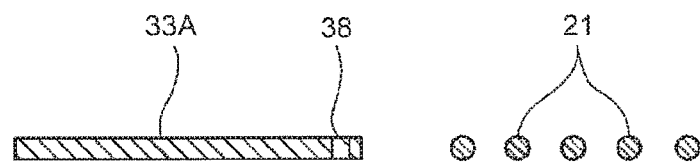
FIG. 11A is a cross-sectional view illustrating an arranging step illustrated in FIG. 10A.
Figure 11B:
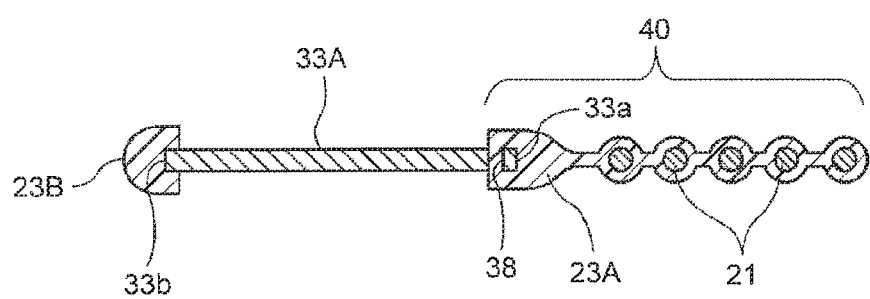
FIG. 11B is a cross-sectional view illustrating a coating step illustrated in FIG. 10B.
Figure 11C:
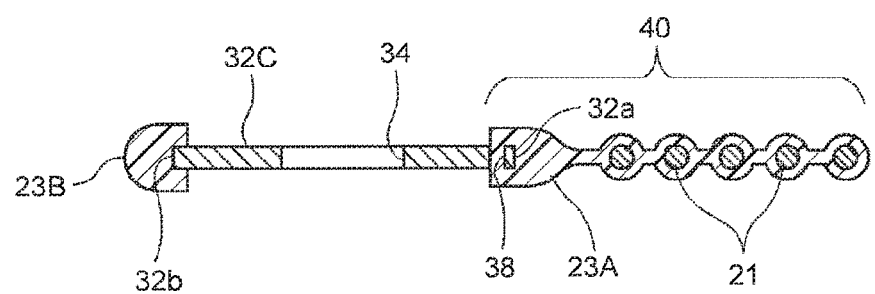
FIG. 11C is a cross-sectional view illustrating a pressing step illustrated in FIG. 10C.

Next, the pressing step illustrated in FIG. 10C will be described. The pressing step is performed similarly to the first embodiment. For this reason, in the pressing step, the flat circuit body 60A is cut in a desired longitudinal length, and the terminal insertion holes 34 and the plurality of partition insertion portions 45 are punched in the flat circuit body 60A at a predetermined gap P in the longitudinal direction of the flat plate conductor 33A so that the plurality of busbars 32C is formed. Two busbars 32B are also formed based on the configuration of the battery wiring module 30A. Here, the partition insertion portion 45 is punched at a position different from the through-hole 38.

As the connecting step, any one of the connecting steps described in the first to third embodiments may be employed. Accordingly, the battery wiring module 100 is completed.

In the battery wiring module 100 according to the embodiment, since the connection reinforcement portion formed as the through-hole 38 is provided in one long side portion 33a of the flat plate conductor 33A, the connection force between the first insulating resin portion 23A of the voltage detection line 40 and the busbar 32C having the partition insertion portion 45 punched therein can be increased. For this reason, in the battery wiring module 100, it is possible to prevent the busbar 32C from being carelessly separated from the first insulating resin portion 23A even when the side edge portions 32a and 32b of the busbar 32C are not largely covered by the first insulating resin portion 23A or the second insulating resin portion 23B. In addition, the battery wiring module 100 has, of course, the same operation and effect as the battery wiring modules 30A, 30B, 80, and 90 of the first to third embodiments. In addition, the connection reinforcement portion is not limited to the through-hole 38 of the embodiment. For example, a bent portion may be provided in one long side portion 33a of the flat plate conductor 33A. It is needless to mention that various configurations can be used based on the spirit of the present invention.

As described above, in the battery wiring modules 30A, 30B, 80, 90, and 100 according to the above-described embodiments, it is possible to easily wire the battery cells 12 with a simple structure, to improve the versatility, and to decrease the manufacturing cost.

Further, the present invention is not limited to the above-described embodiments, and appropriate modification and improvement can be made. In addition, the materials, the shapes, the dimensions, the number, and the arrangement positions of the components of the above-described embodiments are not limited as long as the present invention can be achieved. For example, in the battery wiring module, the insulating resin portion can be formed in a manner such that the outer peripheral portions of the plurality of linear conductors and the side edge portion adjacent to the linear conductors in the plurality of busbars are interposed between two insulation sheets and both insulation sheets are stuck or fused to each other.

In a battery wiring module according to the present invention, it is possible to wire the battery cells easily with a simple structure, to increase the versatility, and to decrease the manufacturing cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A battery wiring module comprising:
a plurality of linear conductors which is disposed in parallel with a predetermined gap therebetween;
a plurality of busbars which is disposed in parallel along at least one of the linear conductors while having the predetermined gap therebetween so as to electrically connect electrode terminals provided in at least two battery cells which are connected to each other in a same direction as the at least two battery cells overlap each other, the electrode terminals also being arranged in the same direction;
an insulating resin portion configured integrally to coat outer peripheral portions of the plurality of linear conductors and side edge portions adjacent to the linear conductors in the plurality of busbars; and
an electric connection portion configured electrically to connect the linear conductors and the busbars to one another, wherein
the electric connection portion is a connection conductor of which one end is provided with a press-contact connection portion so as to be press-connected to at least one of the linear conductors coated by the insulating resin portion and the other end is electrically connected to at least one of the busbars,
wherein a cathode busbar to be electrically connected only to a cathode terminal and an anode busbar to be electrically connected only to an anode terminal are provided, and wherein the cathode busbar and the anode busbar are provided with cut raised portions electrically connected to the at least one of the linear conductors coated by the insulating resin portion.

2. The battery wiring module according to claim 1, wherein
the side edge portion of the busbar is provided with a connection reinforcement portion which increases a connection force between the busbar and the insulating resin portion.

3. The battery wiring module according to claim 1, further comprising:
a second insulating resin portion integrally connecting opposite side edge portions of the plurality of busbars.

* * * * *